US012710173B2

(12) United States Patent
Ekman et al.

(10) Patent No.: US 12,710,173 B2
(45) Date of Patent: Aug. 18, 2026

(54) METHOD AND DEVICE FOR HEATING A FURNACE

(71) Applicant: Linde GmbH, Pullach (DE)

(72) Inventors: Tomas Ekman, Pullach (DE); Ola Ritzén, Pullach (DE); David Muren, Pullach (DE)

(73) Assignee: LINDE GMBH, Pullach (DE)

( * ) Notice: Subject to any disclaimer, the term of this patent is extended or adjusted under 35 U.S.C. 154(b) by 559 days.

(21) Appl. No.: 17/757,273

(22) PCT Filed: Dec. 17, 2020

(86) PCT No.: PCT/EP2020/025586
§ 371 (c)(1),
(2) Date: Jun. 13, 2022

(87) PCT Pub. No.: WO2021/121663
PCT Pub. Date: Jun. 24, 2021

(65) Prior Publication Data
US 2023/0003378 A1 Jan. 5, 2023

(30) Foreign Application Priority Data
Dec. 18, 2019 (EP) .................................... 19020707

(51) Int. Cl.
*F27B 9/30* (2006.01)
*F23C 6/04* (2006.01)
*F23D 14/32* (2006.01)
*F23N 5/10* (2006.01)
*F27B 9/20* (2006.01)
*F27B 9/36* (2006.01)
*F27D 19/00* (2006.01)
*F27D 99/00* (2010.01)

(52) U.S. Cl.
CPC ................ *F23C 6/04* (2013.01); *F23D 14/32* (2013.01); *F23N 5/102* (2013.01); *F27B 9/20* (2013.01);
(Continued)

(58) Field of Classification Search
CPC .......... F23L 7/007; F23L 9/04; C21C 5/4606; C21C 5/4673; F23C 5/32; F23C 6/04;
(Continued)

(56) References Cited

U.S. PATENT DOCUMENTS 4,606,529 A * 8/1986 Tooch ........................ F27B 9/40
266/87
9,541,290 B2 * 1/2017 Iyoha .................... C03B 5/2353
(Continued)

FOREIGN PATENT DOCUMENTS

CN 114746697 A 7/2022
EP 2645036 A1 * 10/2013 ............. B21B 37/74
(Continued)

OTHER PUBLICATIONS

Malaysian Office Action dated Dec. 9, 2025 issued in corresponding application PI2022003052.

*Primary Examiner* — Gregory A Wilson
(74) *Attorney, Agent, or Firm* — Millen, White, Zelano & Branigan P.C.; Ryan R. Pool

(57) ABSTRACT

A method for heating a furnace is provided in which in the furnace has at least one heating zone which is heated by combusting a fuel with an oxidant. The furnace further has a dark zone, downstream of the heated zone, to which) no fuel is supplied directly. The fuel and oxidant are supplied to the heating zone is substoichiometric manner, in that between 10% and 40% of the total oxidant for achieving stoichiometric or near stoichiometric combustion is supplied directly to the dark zone. The flue gas temperature is measured in and/or downstream of the dark zone, and the share of the total oxidant supplied to the dark zone is controlled so as not to exceed a predetermined maximum measured temperature. A method for retrofitting an existing furnace is also provided.

13 Claims, 5 Drawing Sheets

(52) U.S. Cl.
CPC ................ *F27B 9/36* (2013.01); *F27D 19/00* (2013.01); *F27D 99/0033* (2013.01); *F23C 2900/06041* (2013.01)

(58) Field of Classification Search
CPC . F23C 7/02; F23D 14/32; F27D 19/00; F23N 5/102
See application file for complete search history.

(56) References Cited

U.S. PATENT DOCUMENTS

| | | | | |
|---|---|---|---|---|
| 10,392,284 | B2 * | 8/2019 | Francis, Jr. | C03B 5/2353 |
| 10,746,402 | B2 * | 8/2020 | Ritzén | F27B 9/36 |
| 2002/0050670 | A1 * | 5/2002 | Delabroy | C21D 1/52<br>266/249 |
| 2012/0279353 | A1 * | 11/2012 | Englund | C21B 13/10<br>266/200 |
| 2013/0255341 | A1 * | 10/2013 | Ekman | F27B 9/28<br>432/19 |
| 2015/0168067 | A1 * | 6/2015 | Eichler | F27B 9/3005<br>432/19 |

FOREIGN PATENT DOCUMENTS

| | | | | | |
|---|---|---|---|---|---|
| EP | 2891859 | A1 | * | 7/2015 | F27B 9/20 |
| EP | 3412999 | A1 | | 12/2018 | |
| EP | 3412999 | B1 | * | 11/2019 | C21C 5/4606 |
| JP | 09263835 | A | * | 10/1997 | |
| WO | WO-2015132082 | A1 | * | 9/2015 | C21D 9/561 |

* cited by examiner

METHOD AND DEVICE FOR HEATING A FURNACE

The present invention relates to a method for heating a furnace. Furthermore, the invention relates to a method for retrofitting an existing furnace for more flexible heating operation. The invention also relates to such a furnace.

Industrial heating furnaces for heating metal materials, such as steel slabs, are conventionally heated by a fuel, which is combusted together with an oxidant. Normally, a main part of such combustion takes place in a main heating zone. The combustion products may then flow, counter-currently to the heated metal material, downstream in the furnace towards a flue gas exit at a metal material charging opening. The downstream zone through which the combustion products flow is conventionally denoted a "dark zone".

Hence, the metal material being transported through the furnace, in its upstream direction, is preheated by the hot combustion products in the dark zone on its way from the charging opening to the main heating zone.

For thick materials, it is many times desired to heat the material as early as possible in the furnace, in order for the central parts of the material to be properly heated as soon as possible. The centre of a slab, for instance, needs to be heated to near equilibrium before it can be removed from the furnace for rolling or forging.

This problem has conventionally been solved by adding extra burners in the dark zone, so as to increase heating power there. This increases the flue gas temperature, which may lead to problems in any upstream heat recuperation or regeneration equipment used to harvest thermal energy from the flue gases.

With the aim of not heating the flue gases too much, it has been proposed to use so-called oxyfuel burners (that is, burners operated using a high-oxygen oxidant) in the dark zone. However, this is typically a complex and expensive solution.

Therefore, it is desired to more efficiently be able to heat a metal material in the dark zone, without such a solution being overly complex or expensive.

Furthermore, it is desirable for such a solution to offer increased flexibility in terms of heating powers in a furnace. The latter is particularly true for existing heating furnaces, that otherwise are very expensive to upgrade for providing a more flexible heating power.

The present invention solves the above described problems.

Hence, the invention relates to a method for heating a furnace with a longitudinal direction and a cross plane which is perpendicular to the longitudinal direction, which furnace is arranged with at least one heating zone which is heated using combustion of a fuel with an oxidant, and which furnace is further arranged with a dark zone downstream of said heated zone, to which dark zone no fuel is supplied directly, which method is characterised in that the fuel and oxidant supplied to the heating zone is substoichiometric, in that between 10% and 40% of the total oxidant for achieving stoichiometric or near stoichiometric combustion is supplied directly to the dark zone, in that a flue gas temperature is measured in and/or downstream of the dark zone, and in that the share of the total oxidant supplied to the dark zone is controlled so as not to exceed a predetermined maximum measured such temperature.

Furthermore, the invention relates to a method for retrofitting an existing furnace for operation according to any one of the preceding claims, which existing furnace has a longitudinal direction and a cross plane which is perpendicular to the longitudinal direction, which existing furnace is arranged with at least one heating zone which is heated using combustion of a fuel with an oxidant, and which existing furnace is further arranged with a dark zone downstream of said heated zone, to which dark zone no fuel is supplied directly, which method is characterised in that the method comprises providing a separate oxidant lance arranged to provide oxidant directly to the dark zone; connecting the separate oxidant lance to a source of oxidant; modifying the furnace to supply the fuel and oxidant supplied to the heating zone substoichiometrically to provide between 10% and 40% of the total oxidant for achieving stoichiometric or near stoichiometric combustion by supplying oxidant directly to the dark zone; providing a flue gas temperature sensor arranged to measure the flue gas temperature in and/or downstream of the dark zone; and modifying the furnace to control the share of the total oxidant supplied to the dark zone so as not to exceed a predetermined maximum measured such temperature.

Also, the invention relates to a heating furnace with a longitudinal direction and a cross plane which is perpendicular to the longitudinal direction, which furnace is arranged with at least one heating zone which is heated using combustion of a fuel with an oxidant, and which furnace is further arranged with a dark zone downstream of said heated zone, to which dark zone no fuel is arranged to be supplied directly, which furnace is characterised in that the furnace is arranged to supply fuel and oxidant to the heating zone substoichiometrically, in that the furnace is arranged to supply between 10% and 40% of the total oxidant for achieving stoichiometric or near stoichiometric combustion directly to the dark zone, in that the furnace comprises a flue gas temperature sensor arranged to measure a flue gas temperature in and/or downstream of the dark zone, and in that the furnace is arranged to control the share of the total oxidant supplied to the dark zone so as not to exceed a predetermined maximum measured such temperature.

In the following, the invention will be described in detail, with reference to exemplifying embodiments of the invention and to the enclosed drawings, wherein.

Figure 1:
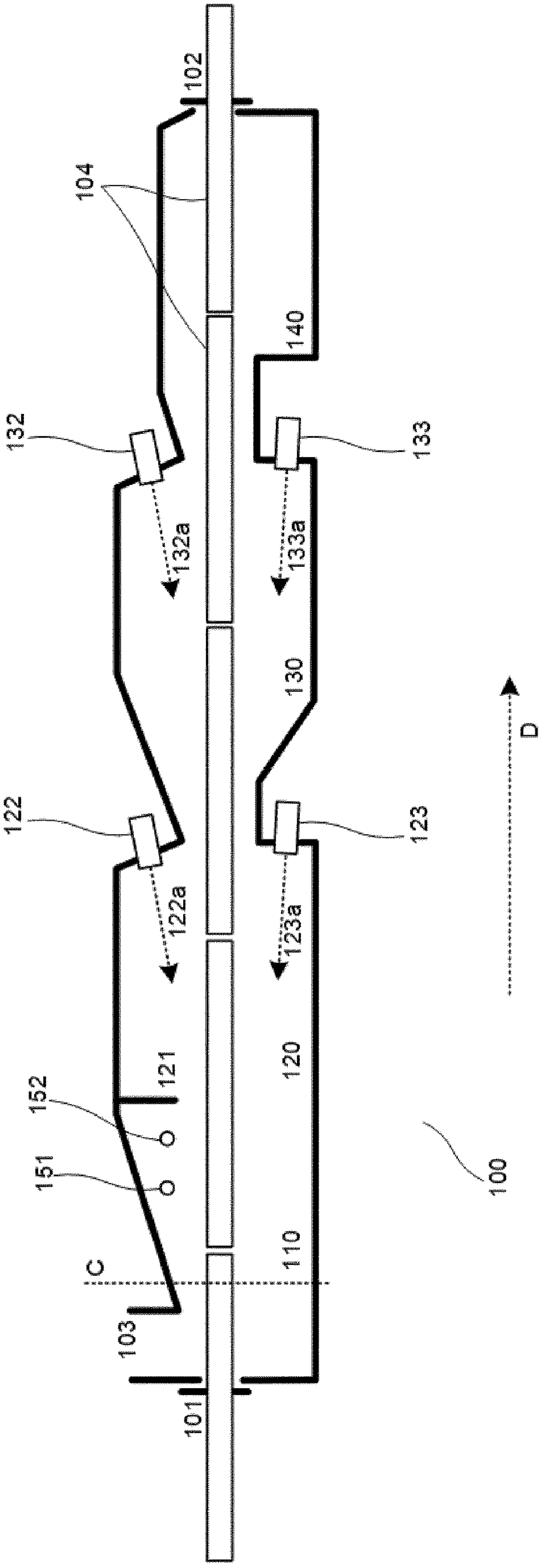
FIG. 1 is a simplified side view of a furnace according to the invention.

Hence, FIG. 1 shows an industrial furnace 100 having a longitudinal direction D and a cross plane C which is perpendicular to the longitudinal direction D. The furnace 100 comprises at least one, but possibly several heating zones 120, 130, 140, through which a metal material 104 is transported, preferably in the longitudinal direction D, whereby the material 104 is heated on its way from an entry door 101 to an exit door 102. The furnace 100 is further arranged with a dark zone 110, arranged near the entry door 101, to which dark zone 110 no fuel is supplied directly.

The furnace 100 may be a continuous reheating furnace, and the material 104 may be a metal material, such as steel.

Preferably, the metal material 104 is at least 10 cm, such as at least 20 cm, thick. In general, the material 104 is preferably heated to temperatures above about 1 000° C.

Each zone 110, 120, 130, 140 may in general comprise both an upper and a lower zone, including the dark zone 110. 121 denotes a baffle arranged to delimit the dark zone 110 from the heating zone 120.

The furnace 100, and in particular the one or several heating zones 120, 130, 140 which are not the said dark zone 110, is heated using combustion of a fuel with an oxidant, both of which are provided directly to the heating zone 120, 130, 140 in question.

The fuel may be a gaseous, liquid or solid fuel. The oxidant supplied to the heating zone 120, 130, 140 in question is preferably an oxidant comprising at least 85% oxygen, and is more preferably industrially pure oxygen, but may in certain embodiments also be air or any other oxidant. For instance, one or several of the burners 122, 123, 132, 133 arranged in the heating zone 120, 130 in question may be adapted for high-oxygen oxidant supplementation, by a respective separate primary oxidant lance 124 (see FIG. 2) being installed at a distance from the respective burner 122 in question, fed with such high-oxygen oxidant from a control device 160 of the furnace 100 via a line 1. The lanced high-oxygen oxidant, forming a jet 124*a* substantially in a downstream direction in the longitudinal direction D, may be the only oxidant used in the non-dark zone heating zones 120, 130, however it may also be used in addition to oxidant which is supplied via the burner 122 itself. In general, the heating zones 120, 130, 140 may be used with any combination of oxyfuel and air burners, even if the present invention is particularly advantageous for furnaces 100 being heated by at least one oxyfuel burner.

Each of the burners 122 so supplemented using a respective primary oxidant lance 124 may in itself be an existing burner 122, such as an air burner, which has been retrofitted by said lance 124, during which retrofitting some or all a previously used oxidant (such as air) was replaced by the said high-oxygen oxidant.

Figure 2:
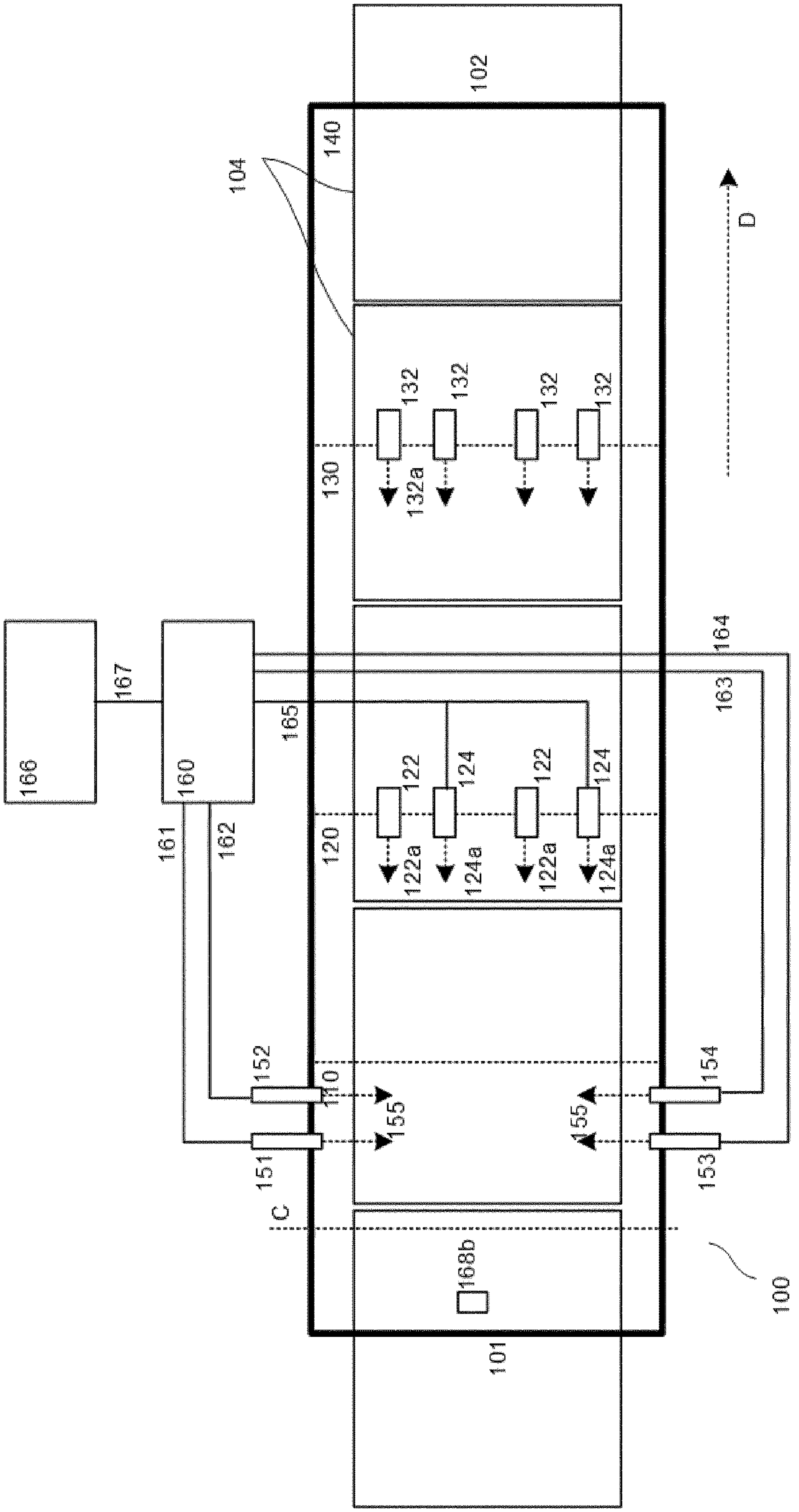
FIG. 2 is a simplified top view of the furnace illustrated in FIG. 1.

In the arrangement according to FIGS. 1 and 2 the burners 122, 132 essentially fire in the longitudinal direction D, i.e. the oxidant and the fuel are supplied to the heating zone 120, 130 essentially in the longitudinal direction D. The fuel, the oxidant and the combustion products are essentially parallel to the metal material to be heated. Such furnaces are also referred to as front or back fired furnaces.

The invention may also be applied to so-called side fired furnaces where the burners for heating the heating zone are arranged in the side walls of the furnace. The burners fire in an essentially horizontal direction perpendicular to the longitudinal direction D. According to the invention oxidant lances are preferably arranged in the side walls of the dark zone of the furnace.

Figure 6:
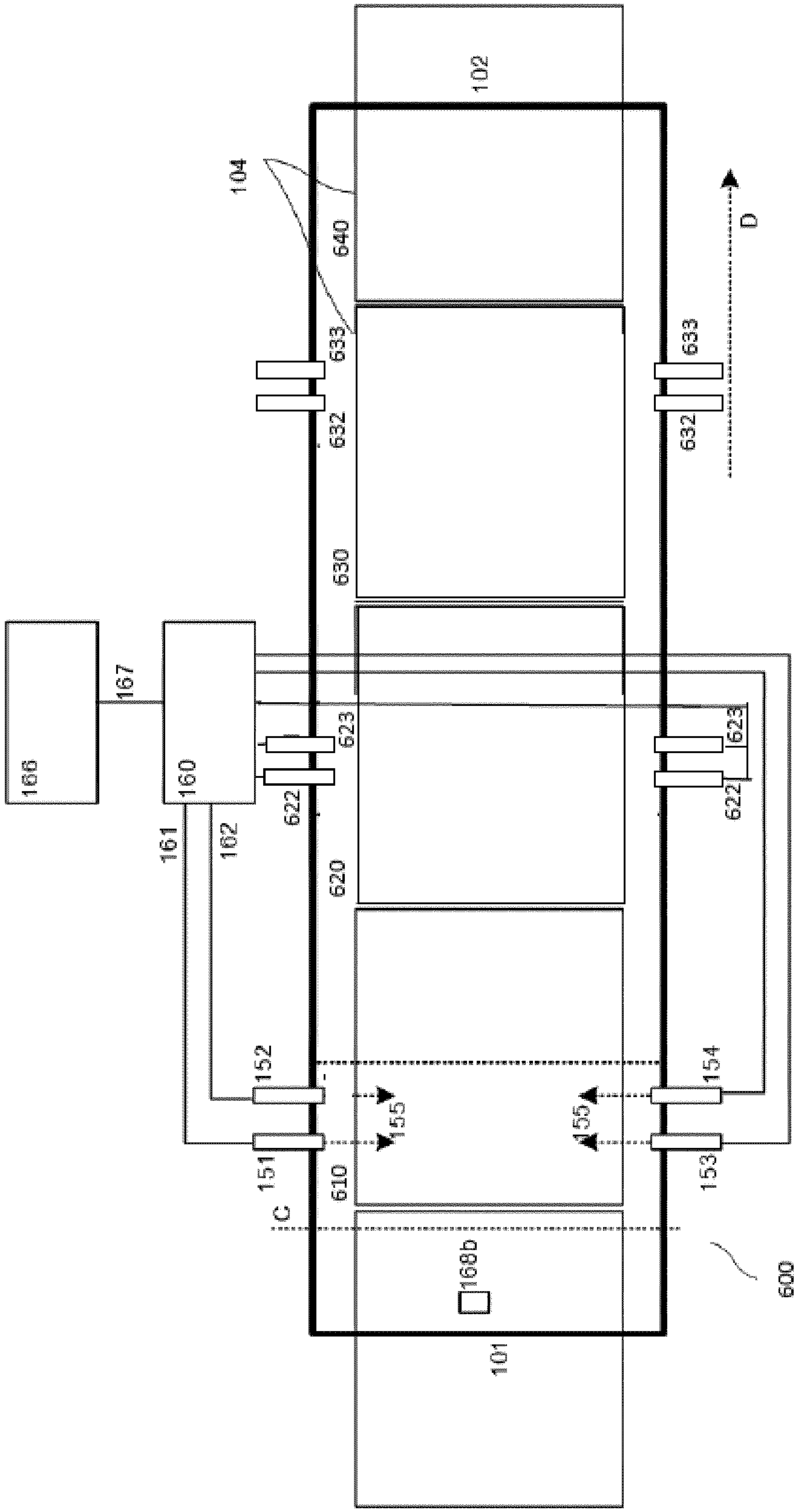
FIG. 6 is a simplified view of a side-fired furnace according to the invention.

FIG. 6 shows a side fired continuous reheating furnace 600 having a longitudinal direction D and a cross plane C which is perpendicular to the longitudinal direction D. The furnace 600 is similar to furnace 100 shown in FIGS. 1 and 2. The furnace 600 comprises several heating zones 620, 630, 640, through which a metal material 104 is transported and heated. The furnace 600 is further arranged with a dark zone 610, arranged near the entry door 101, to which dark zone 610 no fuel is supplied directly.

The furnace 600, and in particular the one or several heating zones 620, 630, 640 which are not the said dark zone 610, is heated using combustion of a fuel with an oxidant, both of which are provided directly to the heating zone 620, 630, 640 in question.

The fuel may be a gaseous, liquid or solid fuel. The oxidant supplied to the heating zone 620, 630, 640 is preferably an oxidant comprising at least 85% oxygen, and is more preferably industrially pure oxygen, but may in certain embodiments also be air or any other oxidant.

In one embodiment one or several of the burners 622, 623, 632, 633 arranged in the heating zone 620, 630 are adapted for high-oxygen oxidant supplementation, by a respective separate primary oxidant lance (not shown) being installed at a distance from the respective burner 622 in question, fed with such high-oxygen oxidant from a control device 660. The lanced high-oxygen oxidant may be the only oxidant used in the nondark zone heating zones 620, 630, however it may also be used in addition to oxidant which is supplied via the burner 622 itself. In general, the heating zones 620, 630, 640 may be used with any combination of oxyfuel and air burners.

Each of the burners 622 so supplemented using a respective primary oxidant lance may in itself be an existing burner 622, such as an air burner, which has been retrofitted by said primary oxidant lance, during which retrofitting some or all a previously used oxidant (such as air) was replaced by the said high-oxygen oxidant.

According to a preferred embodiment the heating zone 620, 630, 640 of the furnace 600 is heated by burners 622, 623, 632, 633 wherein all burners 622, 623, 632, 633 heating the heating zone 620, 630, 640 are located in the side walls of the furnace 600.

In another preferred embodiment the burners 622, 623, 632, 633 located in the side walls of the heating zone 620, 630, 640 are supplemented with an oxidant lance arranged close to the burner 622, 623, 632, 633 for supplying a share of the oxidant to the heating zone 620, 630, 640.

Preferably, for front- or back-fired furnaces 100 as well as for side-fired furnaces 600 all oxidant is supplied to the dark zone 110, 610 via lances arranged in the side walls of the furnace 100, 600.

The following advantageous embodiments are valid for front-fired, back-fired and side-fired furnaces.

The temperature in the heating zones 120, 130, 140, 620, 630, 640 of furnaces 100, 600 may preferably be at least 1000° C. The flue gases run counter-currently to the transport direction through the furnace 100, 600 of the material 104.

According to the invention, the fuel and oxidant supplied to the non-dark zone heating zone 120, 130, 140, 620, 630, 640 is controlled to be substoichiometric, meaning that there is a fuel surplus in relation to the available oxidant in the said heating zone 120, 130, 140, 620, 630, 640 as a whole. In particular, the flue gases reaching the downstream part of the heating zone 120, 620 arranged just upstream of the dark zone 110, 610 comprises a combustible fuel surplus, a consequence of which is that the flue gases flowing into the dark zone 110, 610 carry such a fuel surplus.

Further according to the invention, between 10% and 40%, preferably between 25%-40%, of the total oxidant for achieving stoichiometric or near stoichiometric combustion is then supplied directly to the dark zone 110, 610, such as via lances 151, 152, 153, 154. It is noted that these relative amounts relate to the amount of oxygen in the respective oxidant. In the exemplifying embodiment illustrated in FIGS. 1 and 2 and in FIG. 6, there are two pairs 151, 152; 153, 154 of such dark zone 110, 610 oxidant lances, one pair on each lateral side of the furnace 100, 600 and pointing into the dark zone 110, 610 to deliver oxidant directly to the dark zone 110, 610, such as horizontally from locations arranged in its side walls.

In one preferred embodiment, the above described reallocation of the oxidant from the heating zones 120, 130, 140, 620, 630, 640 to the dark zone 110, 610 results in that a gas volume flow (number of molecules) passing into the dark zone 110, 610 remains the same or substantially the same, while the gas mass flow decreases due to the reallocated oxidant.

In an alternative embodiment, the respective temperature in the heating zones 120, 130, 140, 620, 630, 640 in question is maintained, as compared to before said reallocation of oxidant supply, by increasing firing power in the heating zone 120, 130, 140, 620, 630, 640. For instance, this may encompass increasing the amount of provided fuel per time unit. It has turned out that the net effect, at constant power, in general is positive by performing the reallocation of oxidant according to the present invention, even if the temperature in the heating zone 120, 130, 140, 620, 630, 640 is thus maintained.

Either way, the flue gas temperature exiting via flue 103 is not substantially increased, or at least not increased more than 10%, as compared with conventional operation without active heating in the dark zone 110, 610.

The lances 151, 152, 153, 154 are supplied with said oxidant from said control device 160 via respective lines 161, 162, 163, 164.

Further according to the invention, a flue gas temperature sensor **168*b* is arranged to measure a flue gas temperature in and/or downstream of the dark zone 110, 610, such as in a flue 103. Furthermore, the share of the total oxidant supplied to the dark zone 110, 610 is controlled by the control device 160 so as not to exceed a predetermined maximum measured such temperature. Preferably, the share of the total oxidant supplied to the dark zone 110, 610 via said lances 151, 152, 153, 154 is thus regulated so as to achieve a predetermined measured such temperature of the flue gases. Hence, if the measured temperature of the flue gases is too high, less (or more, depending on configuration) oxidant is supplied to the dark zone 110, 610**, and vice versa. The predetermined maximum temperature may, for instance, be between 800 and 1000° C. The predetermined temperature may be between 600 and 900° C., and may be fixed or variable during operation.

At the same time, the total amount of oxidant supplied to the non dark zone heating zone 120, 130, 140, 620, 630, 640 and to the dark zone 110, 610 may be regulated so as to achieve a predetermined heating power of the furnace 100, 600 as a whole.

Hence, part of the oxygen flow that is normally injected next to the heating zone 120, 130, 140, 620, 630, 640 in a conventional air- or oxyfuel-operated furnace, is instead redirected to lances 151, 152, 153, 154 arranged downstream of the heating zone 120, 130, 140, 620, 630, 640, in a part the dark zone 110, 610 where the temperature is above the auto ignition temperature.

This way, the conventionally fired heating zone 120, 130, 140, 620, 630, 640 is instead fired at substoichiometric conditions, and the part of the fuel that is not fully combusted will move with the off-gasses to the dark zone 110, 610 where it meets the redirected part of the oxidant stream to be fully combusted.

As a result, the part of the heat that is normally generated in the conventional heating zone 120, 130, 140, 620, 630, 640 is instead released in the dark zone 110, 610, boosting production by heating the material 104 earlier during its transition through the furnace 100, 600. As compared to a dark zone 110, 610 boosting burner, releasing both fuel and oxidant directly into the dark zone 110, 610, the present invention is a less complex and more energy efficient solution.

Furthermore, in a solution according to the present invention, the control device 160 may be arranged to adjust down, or preferably completely switch off, the dark zone 110, 610 lances 151, 152, 153, 154, hence providing a larger possible power spectrum for the furnace 100, 600. In particular, at low production, the lances 151, 152, 153, 154 lances can be turned off during low power operation, to maximise energy efficiency in the furnace 100, 600.

Hence, the present invention in a way provides a staged combustion of the fuel provided in the heating zone 120, 130, 140, 620, 630, 640, which further leads to a reduced $NO_x$ formation, and also the potential to reduce the amounts of NO formed in upstream arranged heating zones 120, 130, 140, 620, 630, 640.

Another advantage is that firing at substoichiometric conditions where the material 104 temperature is higher, and oxidation more prevalent, also reduces the formation of oxides (scale) on the material 104 surface. As a matter of fact, the combustion gases flowing into the dark zone 110, 610 will have reducing properties.

In some embodiments, the oxidant supplied to the heating zone 120, 130, 140, 620, 630, 640 and to the dark zone 110, 610 are supplied via a line 167 from the same source 166, such as under the control of the control device 160.

In this and in other embodiments, it is preferred that the oxidant supplied to the heated zone 120, 130, 140, 620, 630, 640 comprises at least 85% oxygen, and preferably is industrially pure oxygen, and the corresponding applies to the oxidant supplied to the dark zone 110, 610, which thus preferably comprises at least 85% oxygen, and preferably is industrially pure oxygen. Preferably, the oxidant provided directly to the dark zone 110, 610 may be identical to at least one oxidant provided directly to the heating zones 120, 130, 140, 620, 630, 640.

Since no or only little ballast gas (such as $N_2$) is heated as a result of the additional combustion taking place in the dark zone 110, 610, the process can be made very energy efficient, and most or all of the added thermal energy can be used to heat the material 104 before the flue gases leave through the flue 103, as compared to the conventional case with no combustion in the dark zone 110, 610, or if additional fuel is added to the dark zone 110, 610 using boosting burners there.

To further increase efficiency and to decrease $NO_x$ formation, the oxidant delivered via lances 151, 152, 153, 154 may be supplied to the dark zone 110, 610 via at least one oxidant lance, preferably via all said lances 151, 152, 153, 154, operated at a lancing velocity of least at Mach 1, more preferably at least Mach 1.2, still more preferably at least Mach 1.3. This will produce a turbulent gas flow in the dark zone 110, 610, leading to decreased prevalence of hot spots and a generally even temperature profile.

In order to further increase energy efficiency, by maximizing the amount of thermal energy delivered to the material 104 before the flue gases leave via flue 103, the oxidant supplied in the dark zone 110, 610 may be supplied to the 35% most upstream arranged part of the dark zone 110, 610. In other words, the oxidant is delivered to respective points that all lie at the most a distance from the most downstream arranged heating zone 120, 620 which is no more than 35% of the total longitudinal D length of the dark zone 110, 610.

As illustrated in FIGS. 2 and 6, the oxidant supplied to the dark zone 110, 610 may be supplied through at least one lance 151, 152, 153, 154 which is substantially parallel to the cross plane C. In particular in this case, the oxidant supplied to the dark zone 110, 610 may be supplied via at least two lances (such as 151, 154) on either side of the furnace 110, so that the two lanced streams 155 of oxidant either intersect or cooperate so as to give rise to a rotation of the dark zone 110, 610 atmosphere. Such a rotation may be oriented in the cross plane C or in any other plane in the dark zone 110, 610, and can for instance be achieved by the lances 151, 152, 153, 154 being directed substantially towards each other but with a slight divergence, so that the jet 155 from one of them is directed slightly upwards while the other is directed slightly downwards, or forwards/backwards.

Herein, that two lanced jets 155 of oxidant "intersect" is intended to mean that at least a part of the two intersecting bodies overlap during operation of the furnace 100, 600.

The lances 151, 152, 153, 154 may all be arranged above the material 104 to be heated, in an upper zone of the dark zone 110, 610, and may then be arranged to provide their respective jets 155 also above the material 104 to be heated. However, a lower zone of the dark zone 110, 610 may also be provided with oxidant, in a corresponding manner.

Many times the material 104 is carried on a mechanism being supported by supporting pillars beneath the material 104. In the particular situation in which a part of the lanced oxidant supplied to the dark zone 110, 610 is supplied at a point below the material 104 to be heated, it is preferred that this oxidant is supplied at a distance of between 20% and 50%, preferably about 30%-35%, of the longitudinal D distance between two such supporting pillars, downstream of such a supporting pillar. This has proven to yield good results in terms of efficiency and temperature homogeneity. In particular, this may be important by guaranteeing an even temperature profile of the material 104 entering the heating zone 120, 130, 140, 620, 630, 640.

In case the dark zone 110, 610 is delimited by a baffle 121, it is preferred that the lances 151, 152, 153, 154 provide the oxidant to the dark zone 110, 610 at least slightly below the lowest level of the said baffle 121.

Figure 3:
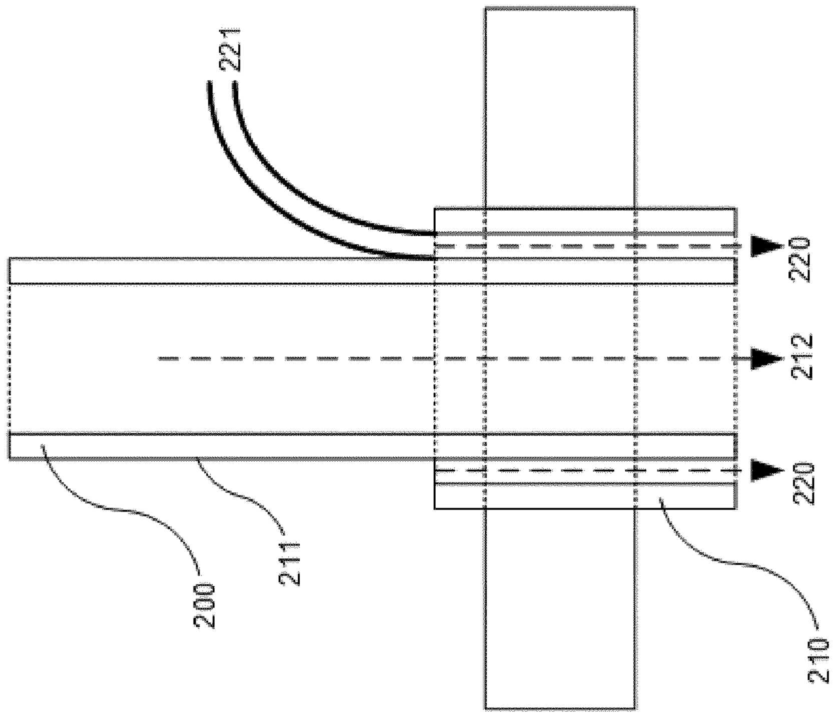
FIG. 3 is a simplified detail view of an oxidant lance in accordance with the present invention.

Regarding the construction of the lances 151, 152, 153, 154 themselves, it is preferred that each of said lances 200 are arranged in a respective tube 210, through which tube 210 cooling air 220 is supplied, such as from a suitable source 221, in a way so that the cooling air 220 surrounds the respective lance 200 envelope surface 211. The lanced oxidant is supplied in a stream 212, concentrically within the cylindrical stream 220 of cooling air. This is illustrated, in cross-section, in FIG. 3. The cooling air may be supplied in volumes that are insignificant in relation to the amounts of lanced oxidant in the dark zone 110, 610, so that the cooling air substantially does not affect combustion efficiency.

Figure 4:
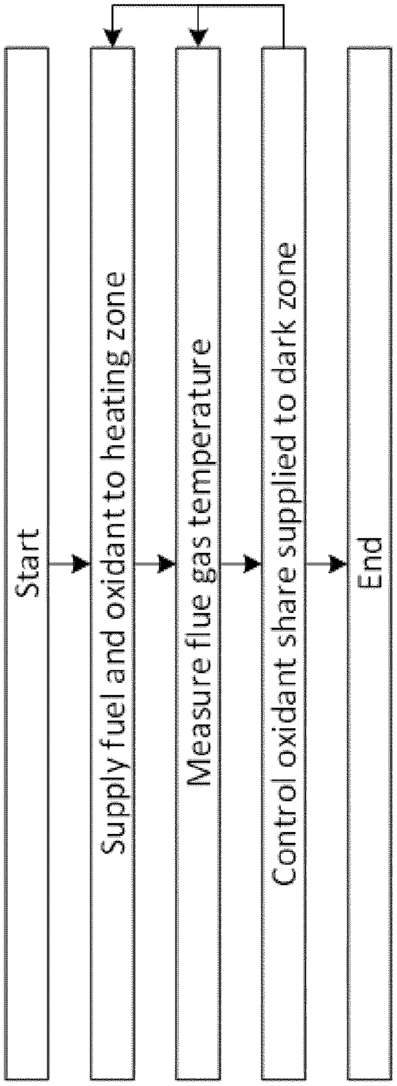
FIG. 4 is a flow chart illustrating a method according to the invention for heating a furnace of the type generally illustrated in FIG. 1.

FIG. 4 illustrates a method according to the present invention, using a front- or back-fired furnace 100 or a side-fired furnace 600 described above, and controlled by the control device 160.

In a first step, the method starts.

In a subsequent step, fuel and oxidant is supplied to the heating zone 120, 130, 140, 620, 630, 640 in a substoichiometric manner, while between 10% and 40% of the total oxidant for achieving stoichiometric or near stoichiometric combustion is supplied directly to the dark zone 110, 610.

In a subsequent step, a flue gas temperature is measured in and/or downstream of the dark zone 110, 610.

In a subsequent step, the share of the total oxidant supplied to the dark zone 110 is controlled so as not to exceed said predetermined maximum measured such temperature.

Then, the method reiterates to the second or third step, or ends in case operation is to be stopped.

The operation according to the present method furthermore allows for a wider power spectrum for one and the same furnace 100, 600. Hence, when higher powers are required, it is possible to supply oxidant to the dark zone 110, 610 while increasing the oxidant provided to the heating zones 120, 130, 140, 620, 630, 640 towards conventional flows. When lower powers are required, it is possible to decrease or completely halt oxidant supply to the dark zone 110, 610. In case the heating zone 120, 130, 140, 620, 630, 640 is heated using both air and oxyfuel burners, it is also possible to decrease, or even completely halt, oxyfuel oxidant supply in the heating zones 120, 130, 140, 620, 630, 640 and instead only supply high-oxygen oxidant via lances 151, 152, 153, 154.

The temperature of the flue gas in or downstream of the dark zone 110, 610 can be regulated by continuously adjusting, or adjusting by an on/off control, the oxidant supplied via lances 151, 152, 153, 154. This control can be performed as a cascade regulation, under the assumption that an upstream temperature regulation of the temperature in the heating zones 120, 130, 140, 620, 630, 640 works reliably. Such flue gas temperature regulation can then be performed by the control device 160 and using the sensor **168*b* and a simple valve along the line 161, 162, 163, 164, independently of the temperature regulation of the heating zones 120, 130, 140, 620, 630, 640**.

Figure 5:
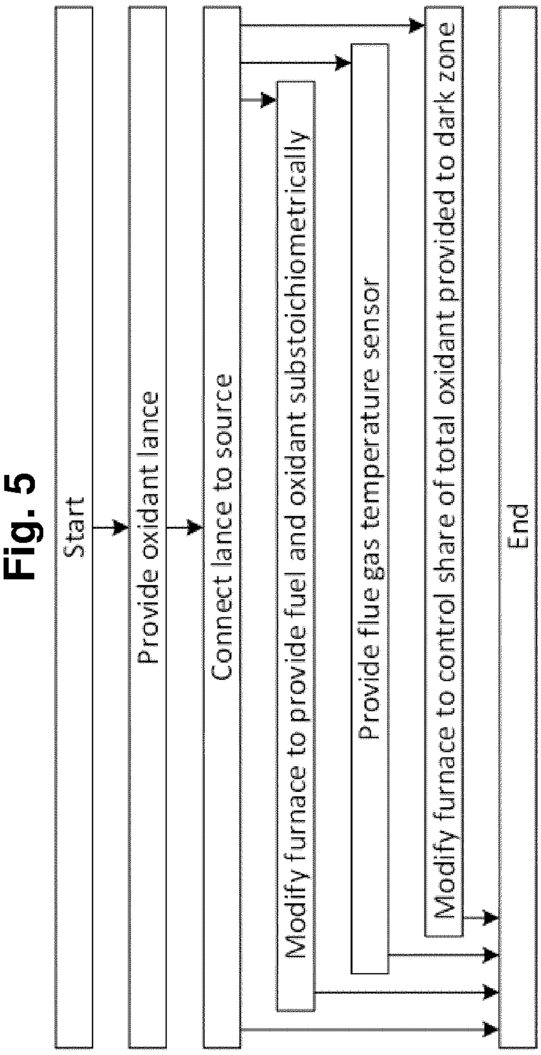
FIG. 5 is a flow chart illustrating a method according to the invention for modifying or retrofitting an existing furnace for operation according to the flow chart illustrated in FIG. 4.

FIG. 5 also illustrates a method according to the present invention, but for retrofitting an existing furnace 100, 600 for operation according to the above described method. In general, the existing furnace 100, 600 has said longitudinal direction L and said cross plane C being perpendicular to the longitudinal direction L. Moreover, the existing furnace 100, 600 is in general arranged with at least one heating zone 120, 130, 140, 620, 630, 640 of the above described type, which is heated using combustion of a fuel with an oxidant. The existing furnace 100, 600 is further arranged with a dark zone 110, 610 of said type, downstream of said heated zone 120, 130, 140, 620, 630, 640, to which dark zone 110, 610 no fuel is supplied directly. The furnace may either be a front- or backfired furnace 100 or a side-fired furnace 600.

In a first step, the method starts.

In a subsequent step, a separate oxidant lance 151, 152, 153, 154 of the above described type, arranged to provide oxidant directly to the dark zone 110, 610, is provided. Such a separate oxidant lance 151, 152, 153, 154 may, for instance, be provided by drilling a hole through the side wall of the dark zone 110, 610 and mounting such a lance 151, 152, 153, 154 in the drilled hole.

In a subsequent step, the separate oxidant lance 151, 152, 153, 154 is connected to the source of oxidant 166, such as by line 161, 162, 163, 164.

In a subsequent of parallel step, the existing furnace 100, 600 is modified, such as by modifying or adding the control device 160, to supply the fuel and oxidant supplied to the heating zone 120, 130, 140, 620, 630, 640 substoichiometrically to provide between 10% and 40% of the total oxidant for achieving stoichiometric or near stoichiometric combustion by supplying oxidant directly to the dark zone 110, 610, via the installed lance 151, 152, 153, 154. This has been described in detail above.

In a subsequent or parallel step, the flue gas temperature sensor **168*b*, arranged to measure the flue gas temperature in and/or downstream of the dark zone 110, 610**, is provided.

In a subsequent or parallel step, the existing furnace 100, 600 is modified to control the share of the total oxidant supplied to the dark zone 110, 610, via the lance 151, 152, 153, 154 so as not to exceed said predetermined maximum measured such temperature, preferably to keep said predetermined temperature.

Thereafter, the method ends, and the existing furnace 100, 600 is ready for being operated according to the above method.

Preferably, this modification method does not comprise modifying the existing furnace 100, 600 to supply more fuel than before. In other words, the modification substantially only results in a shift of supplied oxidant from the heating zone 120, 130, 140, 620, 630, 640 to the previously actively unheated dark zone 110, 610. Hence, the dark zone 110, 610 effectively becomes an actively heated heating zone.

Preferably, the temperature sensor **168*b* may be an already-existing thermo element already present in the existing furnace 100, 600 before the modification method commenced. Also, the control device 160 may preferably be an already existing control device in the existing furnace 100, 600**, which is only modified according to the above, such as by performing a software update.

Preferably, the existing furnace 100, 600 is an oxyfuel furnace, in other words a furnace 100, 600 being heated using at least one high-oxygen oxidant as described above.

Above, preferred embodiments have been described. However, it is apparent to the skilled person that many modifications can be made to the disclosed embodiments without departing from the basic idea of the invention.

For instance, the oxidant supplied to the dark zone 110 can be provided in other ways, in addition to said one or several lances 151, 152, 153, 154. Oxidant lances may also be arranged in the ceiling and/or floor of the dark zone.

Preferably, in a side-fired furnace oxidant lances are supplied in the side walls of the furnace 600 only and all oxidant supplied to the dark zone 610 is supplied via the oxidant lances.

All which is described in relation to the methods illustrated in FIGS. 4 and 5 is also applicable to the system described in relation to FIGS. 1-3 and 6, and vice versa.

Hence, the invention is not limited to the described embodiments, but can be varied within the scope of the enclosed claims.

The invention claimed is:

1. A method for heating a furnace with a longitudinal direction and a cross plane which is perpendicular to the longitudinal direction, which furnace is arranged with at least one heating zone which is heated using combustion of a fuel with an oxidant, and which furnace is further arranged with a dark zone downstream of said heated zone, to which dark zone no fuel is supplied directly, wherein the fuel and oxidant supplied to the heating zone is substoichiometric, in that between 10% and 40% of the total oxidant for achieving stoichiometric or near stoichiometric combustion is supplied directly to the dark zone, in that a flue gas temperature is measured in and/or downstream of the dark zone, and in that the share of the total oxidant supplied to the dark zone is controlled so as not to exceed a predetermined maximum measured such temperature, wherein all oxidant supplied to the dark zone is supplied via one or more lances located in the side walls of the furnace.

2. The method according to claim 1, wherein all fuel and all oxidant supplied to the heating zone are supplied via one or more burners and/or via one or more lances located in one or more side walls of the furnace.

3. The method according to claim 2, wherein a portion of the oxidant supplied to the heating zone is supplied via at least one lance.

4. The method according to claim 1, wherein the portion of the oxidant supplied to the dark zone is regulated so as to achieve a predetermined measured such temperature.

5. The method according to claim 1, the total amount of oxidant supplied to the heating zone and the dark zone is regulated so as to achieve a predetermined heating power.

6. The method according to claim 1, wherein the oxidant supplied to the heating zone and to the dark zone are supplied from the same source.

7. The method according to claim 1, wherein the oxidant supplied to the heated zone and/or to the dark zone comprises at least 85% oxygen.

8. The method according to claim 1, wherein that the oxidant is supplied to the dark zone via at least one oxidant lance operated at a lancing velocity of at least Mach 1.

9. The method according to claim 1, wherein that the oxidant supplied to the dark zone is supplied to the 35% most upstream arranged part of the dark zone.

10. The method according to claim 1, wherein that the oxidant supplied to the dark zone is supplied through at least one lance which is substantially parallel to the cross plane.

11. The method according to claim 1, wherein the oxidant supplied to the dark zone is supplied via at least two lances on either side of the furnace, so that the two lanced streams of oxidant either intersect or cooperate so as to give rise to a rotation of the atmosphere within the dark zone.

12. The method according to claim 1, wherein each of said lances are arranged in a respective tube, through which tube cooling air is supplied.

13. A method for retrofitting an existing furnace for operation according to claim 1, which existing furnace has a longitudinal direction and a cross plane which is perpendicular to the longitudinal direction, which existing furnace is arranged with at least one heating zone which is heated using combustion of a fuel with an oxidant, and which existing furnace is further arranged with a dark zone downstream of said heated zone, to which dark zone no fuel is supplied directly, wherein the method comprises providing a separate oxidant lance located in a side wall of the furnace to provide oxidant directly to the dark zone;

connecting the separate oxidant lance to a source of oxidant;

modifying the furnace to supply the fuel and oxidant supplied to the heating zone substoichiometrically to provide between 10% and 40% of the total oxidant for achieving stoichiometric or near stoichiometric combustion by supplying oxidant directly to the dark zone;

providing a flue gas temperature sensor arranged to measure the flue gas temperature in and/or downstream of the dark zone; and, modifying the furnace to control the share of the total oxidant supplied to the dark zone so as not to exceed a predetermined maximum measured such temperature.

* * * * *